United States Patent
Nonaka et al.

(10) Patent No.: US 8,367,177 B2
(45) Date of Patent: Feb. 5, 2013

(54) RELEASE LINER AND PRESSURE-SENSITIVE ADHESIVE SHEET

(75) Inventors: Akiko Nonaka, Ibaraki (JP); Shinji Inokuchi, Ibaraki (JP); Masahiko Ando, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/312,912

(22) PCT Filed: Nov. 30, 2007

(86) PCT No.: PCT/JP2007/073178
§ 371 (c)(1),
(2), (4) Date: Jun. 1, 2009

(87) PCT Pub. No.: WO2008/069128
PCT Pub. Date: Jun. 12, 2008

(65) Prior Publication Data
US 2010/0003441 A1 Jan. 7, 2010

(30) Foreign Application Priority Data
Dec. 5, 2006 (JP) .................. 2006-327888
Oct. 24, 2007 (JP) .................. 2007-275950

(51) Int. Cl.
*B32B 33/00* (2006.01)
*B32B 9/00* (2006.01)
*B32B 7/12* (2006.01)
(52) U.S. Cl. ..... 428/41.8; 428/343; 428/40.1; 428/41.7; 428/323; 428/354; 428/355
(58) Field of Classification Search .................. 428/343, 428/355, 323, 40.1, 41.7, 41.8, 354
See application file for complete search history.

(56) References Cited

U.S. PATENT DOCUMENTS
4,855,170 A * 8/1989 Darvell et al. ............... 428/40.2
(Continued)

FOREIGN PATENT DOCUMENTS
JP 51-20205 7/1975
JP 55-080479 6/1980
(Continued)

OTHER PUBLICATIONS
International Search Report dated Jan. 22, 2008, issued on PCT/JP2007/073178.
(Continued)

*Primary Examiner* — Callie Shosho
*Assistant Examiner* — Samir Shah
(74) *Attorney, Agent, or Firm* — Edwards Wildman Palmer LLP; James E. Armstrong, IV

(57) ABSTRACT

Disclosed is a release liner having a multilayer structure of at least three layers including two surface layers and an intermediate layer, in which one of the two surface layers contains a high-density polyethylene, the other contains a low-density polyethylene, and the intermediate layer contains a low-density polyethylene alone as its resin component. Also disclosed is a pressure-sensitive adhesive sheet including the release liner and at least one pressure-sensitive adhesive layer, in which a release force X (N/mm) between the release liner and the pressure-sensitive adhesive layer and a rigidity Y of the release liner [(Young's modulus of the release liner)×(thickness)$^3$] (N·mm) satisfy the following conditions: $0<X\leq0.285$ and $0<Y<180X^4+0.1$. The release liner and pressure-sensitive adhesive sheet excel in releasability and do not suffer from liner pop-off even when, for example, stored in a curved state. The release liner excels also in recyclability.

5 Claims, 1 Drawing Sheet

U.S. PATENT DOCUMENTS

| | | | |
|---|---|---|---|
| 5,167,995 A | 12/1992 | Johnson et al. | |
| 2003/0077442 A1 | 4/2003 | Inokuchi et al. | |
| 2005/0084684 A1* | 4/2005 | Yamamoto et al. | 428/422 |
| 2005/0266195 A1* | 12/2005 | Nonaka et al. | 428/40.1 |
| 2006/0173121 A1* | 8/2006 | Tamai | 524/502 |

FOREIGN PATENT DOCUMENTS

| | | |
|---|---|---|
| JP | 3179516 | 8/1992 |
| JP | 2003-127299 | 5/2003 |
| JP | 2005-350650 | 12/2005 |
| JP | 2006-022189 | 1/2006 |

OTHER PUBLICATIONS

Office Action issued in JP2007-275950, dated Dec. 20, 2011.
Notification of the Second Office Action issued in Chinese Patent Application No. CN200780043104.9, dated Feb. 13, 2012.
Office Action issued in Japanese Patent Application No. JP2007-275950, dated May 15, 2012.
Notification of Third Office Action issued in Chinese Patent Application No. CN200780043104.9, dated Aug. 7, 2012.

* cited by examiner

RELEASE LINER AND PRESSURE-SENSITIVE ADHESIVE SHEET

TECHNICAL FIELD

The present invention relates to a release liner and a pressure-sensitive adhesive sheet. Specifically, it relates to a release liner suitable for use in a pressure-sensitive adhesive sheet; and a pressure-sensitive adhesive sheet using the release liner.

BACKGROUND ART

Pressure-sensitive adhesive sheets generally each include a sheet member having a release function (hereinafter also referred to as "release liner") and a pressure-sensitive adhesive layer (composed typically of an acrylic pressure-sensitive adhesive) arranged in contact with the sheet member. Releasing (separation) between the sheet member and the pressure-sensitive adhesive layer is possible.

Exemplary known processes for forming the release liner include a process of curing a release agent, such as a silicone release agent, alone to form the release liner; and a process of applying a coat of a release agent to at least a side of a release liner base (substrate) to be in contact with a pressure-sensitive adhesive layer and curing the applied coat. The former process gives a release liner composed of only a layer cured from the release agent; and the latter process gives a release liner having a multilayer structure including the release agent layer as an outermost layer. On the other hand, there have been used release liners composed of polyethylenes and polypropylenes as release liners that do not require coating as above. As a technique for reducing the release force in such release liners, there has been known a technique of using low-density polyethylenes and linear low-density polyethylenes as release layers (see, for example, Patent Documents 1 and 2).

Incidentally, in some pressure-sensitive adhesive sheets, typically those having adhesive layers on both sides, one of the two adhesive layers is applied to an adherend and the other remains in contact with a release liner to form an assembly, and this assembly is subjected to cutting and processing, and then stored for a certain duration before use. Especially when the adherend is a long member or flexible member such as an automobile weather strip, the assembly may be wound as a roll and stored from the viewpoint of space saving. When a pressure-sensitive adhesive sheet with a release liner is stored in a curved state as mentioned above, the release liner may partially separate from the pressure-sensitive adhesive layer to cause so-called "liner pop-off" (liner lifting), and this in turn causes contaminations of the pressure-sensitive adhesive layer.

A possible candidate for inhibiting the liner pop-off is use of a release liner having an increased release force. In this case, however, the release function decreases though the liner pop-off is improved. Specifically, the liner pop-off inhibition and the release function are tradeoffs with respect to each other. As a technique for inhibiting the liner pop-off, there has been known a technique of using, as a release layer, materials containing polar groups (see, for example, Patent Document 3). A release liner of this type, however, is unsuitable for recycling. Demands are now made to provide release liners excelling in recyclability, because the release liners are wasted after use but such environmental loads should be reduced.

[Patent Document 1] Japanese Examined Patent Application Publication No. S51-20205
[Patent Document 2] Japanese Unexamined Patent Application Publication (JP-A) No. S55-80479
[Patent Document 3] Japanese Patent No. 3179516

DISCLOSURE OF INVENTION

Problems to be Solved by the Invention

For solving the above problems, it is an object of the present invention to provide a pressure-sensitive adhesive sheet that excels in releasability and satisfactorily inhibits pop-off of a release liner from a pressure-sensitive adhesive layer. Another object of the present invention is to provide a release liner suitable for use in the pressure-sensitive adhesive sheet.

Means for Solving the Problems

After intensive investigations to achieve the objects, the present inventors have found that a release liner having a specific resin composition and a specific multilayer structure can provide both a suitable release force and satisfactory inhibition of liner pop-off simultaneously. They have also found that an especially superior pressure-sensitive adhesive sheet is obtained when the release force between the pressure-sensitive adhesive layer and the release liner is in a specific relationship with the rigidity of the release liner. The present invention has been made based on these findings.

Specifically, the present invention provides a release liner having a multilayer structure of at least three layers including two surface layers and an intermediate layer lying between them, in which one of the two surface layers mainly contains a high-density polyethylene, the other surface layer mainly contains a low-density polyethylene, and the intermediate layer contains, as its resin component, a low-density polyethylene substantially alone.

According to another embodiment of the present invention, the release liner has a thickness of from 10 to 500 μm.

The present invention also provides a pressure-sensitive adhesive sheet including the release liner and at least one pressure-sensitive adhesive layer, in which the pressure-sensitive adhesive sheet has a release force X (unit: N/mm) between the release liner and the pressure-sensitive adhesive layer, the release liner has a rigidity Y [(Young's modulus of the release liner)×(thickness of the release liner)$^3$] (unit: N·mm), and the release force X and the rigidity Y satisfy the following conditions:

$$0 < X \leq 0.285$$

$$0 < Y < 180X^4 + 0.1$$

In the pressure-sensitive adhesive sheet according to another embodiment of the present invention, the pressure-sensitive adhesive layer mainly contains an acrylic pressure-sensitive adhesive.

In the pressure-sensitive adhesive sheet according to another embodiment, the pressure-sensitive adhesive layer contains bubbles and/or hollow microspheres.

Advantages

The release liner and pressure-sensitive adhesive sheet according to the present invention excel in releasability and do not suffer from liner pop-off even when stored in a curved state. In addition, the release liner excels in recyclability, because it does not contain, for example, polar groups and has a simple structure where respective layers are composed of polyethylenes. Accordingly, the release liner and pressure-sensitive adhesive sheet are industrially useful also from the viewpoints of their performance and environmental friendliness.

REFERENCE NUMERALS

Figure 1:
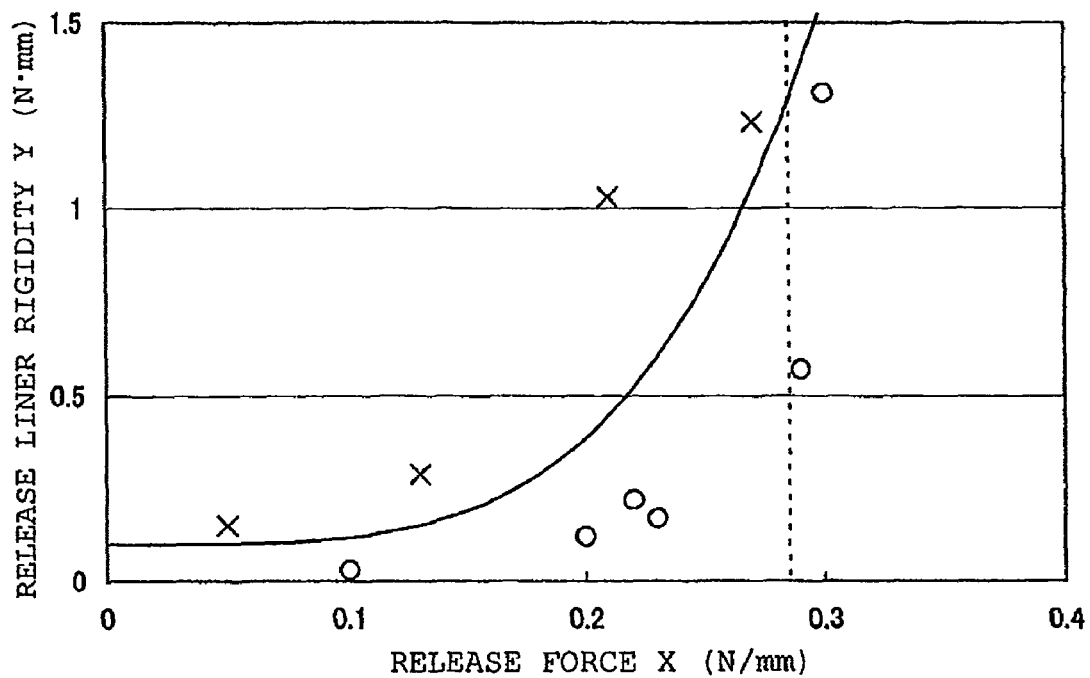
FIG. 1 is a graph showing the rigidity Y of release liners plotted against the release force X of pressure-sensitive adhesive sheets prepared according to Examples and Comparative Examples.

| | |
|---|---|
| 1 | fixing box |
| 2 | test piece |

BEST MODE FOR CARRYING OUT THE INVENTION

The present invention will be illustrated in detail below.

The "release liner" and "pressure-sensitive adhesive sheet" according to the present invention may take the form of a tape. Namely, the terms "release liner" and "pressure-sensitive adhesive sheet" as used herein also include a release tape and a pressure-sensitive adhesive tape, respectively.

The release liner according to the present invention has a multilayer structure of at least three layers including a surface layer mainly containing a high-density polyethylene, another surface layer mainly containing a low-density polyethylene, and an intermediate layer containing, as its resin component, a low-density polyethylene substantially alone. The intermediate layer containing a low-density polyethylene is provided as a layer differing from the surface layer mainly containing a low-density polyethylene. As used herein, the term "high-density polyethylene" refers to a polyethylene having a density of 930 (kg/m$^3$) or more as measured in accordance with Japanese Industrial Standards (JIS) K 6922-2, and the term "low-density polyethylene" refers to a polyethylene having a density of 865 (kg/m$^3$) or more and less than 930 (kg/m$^3$) as measured in accordance with JIS K 6922-2. As used herein the term "low-density polyethylene" is defined as a generic name including ones obtained through polymerization of ethylene monomer by a high-pressure process and having long-chain branches (the lengths of branched chains are not specifically limited); ones obtained through polymerization of ethylene monomer by a high-pressure process and referred to as so-called "low-density polyethylenes" and "very-low-density polyethylenes"; "linear low-density polyethylenes" obtained through polymerization of ethylene and an α-olefin monomer having 3 to 8 carbon atoms (in this case the lengths of short-chain branches are of 1 to 6 carbon atoms); as well as "ethylene-α-olefin copolymer elastomers" having a density within the above-specified range.

The layer mainly containing a high-density polyethylene and constituting one of the surface layers in the present invention mainly contains a high-density polyethylene as its resin component. Specifically, the high-density polyethylene constitutes 50 percent by weight or more (for example, from 50 to 100 percent by weight), and preferably from 60 to 100 percent by weight of total resin components constituting the layer. The surface layer mainly containing a high-density polyethylene may contain, as its resin component, the high-density polyethylene alone or in combination with another resin component.

The high-density polyethylene has a density of preferably 940 (kg/m$^3$) or more [for example, from 940 to 960 (kg/m$^3$)], and more preferably 942 (kg/m$^3$) or more [for example, from 942 to 960 (kg/m$^3$)].

Though not especially limited, the other resin component is preferably a low-density polyethylene from the viewpoints of controlling properties such as releasability. The proportion of a low-density polyethylene, if used as the other resin component, is preferably from about 0 to about 100 parts by weight, and more preferably from 0 to 67 parts by weight, per 100 parts by weight of the high-density polyethylene. As the liner pop-off inhibitory action increases with a decreasing proportion of the low-density polyethylene, and the releasability is improved with an increasing proportion thereof, the proportion can be suitably set from the viewpoints of the respective properties and the flexibility of the entire pressure-sensitive adhesive sheet according to the present invention. A layer containing, as its resin component, a high-density polyethylene and a low-density polyethylene in a ratio of 50:50 is defined herein as a "layer mainly containing a high-density polyethylene".

The layer mainly containing a high-density polyethylene and constituting one of the surface layers herein may further contain, in addition to the resin components, a variety of additives such as pigments, fillers, lubricants, and age inhibitors within ranges not adversely affecting the advantages of the present invention.

The intermediate layer for use in the present invention should contain, as its resin component, substantially a low-density polyethylene alone. Specifically, the low-density polyethylene should constitute 95 percent by weight or more, and preferably constitutes 99 percent by weight or more of total resin components constituting the intermediate layer. As used herein the "low-density polyethylene" may be either a single low-density polyethylene or a blend of two or more low-density polyethylenes, and, in the latter case, the content is applied to the total content of two or more low-density polyethylenes. The term "low-density polyethylene" herein also includes a linear low-density polyethylene. The release liner according to the present invention has increased flexibility and thereby helps to improve the liner pop-off inhibitory action by using, as the intermediate layer, the layer mainly containing a low-density polyethylene alone. Though the release liner according to the present invention may further contain another intermediate layer (additional intermediate layer) in addition to the intermediate layer mainly containing a low-density polyethylene alone as its resin component, the term "intermediate layer for use in the present invention" refers to an intermediate layer which contains a low-density polyethylene alone as its resin component and is a layer essential for the release liner according to the present invention.

The low-density polyethylene preferably has a density of 890 (kg/m $^3$) or more and less than 930 (kg/m$^3$).

The intermediate layer for use in the present invention may further contain, in addition to the resin component, a variety of additives such as pigments, fillers, lubricants, and age inhibitors within ranges not adversely affecting the advantages of the present invention.

The layer mainly containing a low-density polyethylene and constituting the other surface layer for use in the present invention mainly contains, as its resin component, a low-density polyethylene, from the viewpoint of releasability. Specifically, the low-density polyethylene should constitute 50 percent by weight or more (for example, from 50 to 100 percent by weight), and preferably constitutes from 60 to 100 percent by weight of total resin components constituting the layer. The surface layer mainly containing a low-density polyethylene may contain, as its resin component, the low-density polyethylene alone or in combination with another resin component.

The low-density polyethylene preferably has a density of 890 (kg/m$^3$) or more and less than 930 (kg/m$^3$).

Though not especially limited, the other resin component is preferably a high-density polyethylene from the viewpoints of controlling properties such as releasability. The proportion of a high-density polyethylene, if used as the other resin component, is preferably from 0 to 50 parts by weight, more preferably from 0 to 20 parts by weight, and furthermore preferably from 0 to 10 parts by weight, per 100 parts by weight of the low-density polyethylene.

The layer mainly containing a low-density polyethylene and constituting the surface layer herein may further contain, in addition to the resin component, a variety of additives such as pigments, fillers, lubricants, and age inhibitors, within ranges not adversely affecting the advantages of the present invention.

In the present invention, the surface layer mainly containing a low-density polyethylene and the intermediate layer mainly containing a low-density polyethylene are provided as different layers. This configuration is advantageous in that the intermediate layer alone can be colored without compounding a colorant into the surface layer and that the relationship between the releasability and strength can be controlled within a suitable range by adequately controlling the balance between the surface layer and the intermediate layer.

The release liner according to the present invention can use the two surface layers both as release layers. It is especially preferred to use the surface layer mainly containing a high-density polyethylene as a surface showing a higher release force, and the surface layer mainly containing a low-density polyethylene as a surface showing a lower release force. In general, a pressure-sensitive adhesive layer is arranged on the surface layer mainly containing a high-density polyethylene, and the other surface layer mainly containing a low-density polyethylene works as a backside layer to enable smooth unwinding typically when a sheet including the pressure-sensitive adhesive layer and the release liner is wound as a roll.

The release liner according to the present invention may further include another intermediate layer (additional intermediate layer) in addition to the intermediate layer containing, as its resin component, a low-density polyethylene substantially alone. Such additional intermediate layer may be provided, for example, as an adhesive layer for improving the interlayer adhesive strength between respective layers; as a colored layer; or as a layer for imparting another function.

The release liner according to the present invention is preferably substantially composed of low-density polyethylenes and high-density polyethylenes alone as resin components, for the sake of higher recyclability. The content of other resin components than low-density polyethylenes and high-density polyethylenes is preferably less than 20 percent by weight, and more preferably less than 10 percent by weight, based on the total resin components of the release liner.

The thickness of the release liner according to the present invention is preferably 500 μm or less, more preferably 200 μm or less, and furthermore preferably 150 μm or less, from the viewpoint of satisfactory flexibility required typically when the release liner is wound as a roll and then stored. From the viewpoint of handleability, the thickness is preferably 10 μm or more, more preferably 30 μm or more, furthermore preferably 50 μm or more, and most preferably 100 μm or more.

In the release liner according to the present invention, the thickness of the intermediate layer containing, as its resin component, a low-density polyethylene substantially alone is preferably from 5 to 480 μm, and more preferably from 10 to 180 μm, from the viewpoint of controlling the rigidity. The thickness of the layer mainly containing a high-density polyethylene and constituting one of the surface layers is preferably from 2.5 to 250 μm, and more preferably from 5 to 100 μm from the viewpoint of releasability. The thickness of the layer mainly containing a low-density polyethylene and constituting the other surface layer is preferably from 2.5 to 250 μm, and more preferably from 5 to 100 μm, from the viewpoint of releasability. The thickness of an additional intermediate layer may vary depending on the purpose of the additional intermediate layer, is not especially limited, but is preferably about 50 μm or less.

The Young's modulus of the release liner according to the present invention can be appropriately set so that the aftermentioned rigidity Y be a suitable value in the relationship with the thickness. For example, when the release liner has a thickness of from 50 to 200 μm, the Young's modulus is preferably from 30 to 1400 (N/mm$^2$), and more preferably from 50 to 500 (N/mm$^2$).

The release liner according to the present invention may be prepared according to a known or common sheet-forming process such as film formation using melting state (e.g., T-die process or tubular film process) or film formation using solution. A process for laminating layers to constitute the release liner according to the present invention is also not especially limited and can be any known or common process such as co-extrusion, dry lamination, or wet lamination. Among them, co-extrusion is preferred from the viewpoint of productivity.

Among these processes, film formation using a T-die is preferred, because the resulting release liner tends to have better thermal stability. Such release liner having better thermal stability is desirably used typically when a pressure-sensitive adhesive sheet with the release liner is applied to an adherend (for example, a weather strip rubber), and the adhered bearing the pressure-sensitive adhesive sheet with the release liner is as intact subjected to silicone coating and silicone baking process (for example, 120° C. for 3 minutes), because the release liner will not suffer from pop-off and unintended separation even in this use.

The pressure-sensitive adhesive sheet according to the present invention includes the release liner and at least one pressure-sensitive adhesive layer.

For simultaneously providing a liner pop-off inhibitory action and a release function both at high levels, when the pressure-sensitive adhesive sheet according to the present invention has a release force X between the release liner and the pressure-sensitive adhesive layer and has a rigidity Y of the release liner, the release force X and the rigidity Y preferably satisfy conditions represented by the following inequalities:

$$0 < X \leq 0.285, \ 0 < Y < 180X^4 + 0.1$$

The release force X between the pressure-sensitive adhesive layer and the release liner herein is preferably more than 0 (N/mm) and 0.285 (N/mm) or less, and more preferably from 0.15 to 0.25 (N/mm), from the viewpoint of exhibiting satisfactory releasability. If the release force X is more than 0.285 (N/mm), the separation of the release liner from the pressure-sensitive adhesive layer is difficult; and if the release force X is 0 (N/mm), the function of protecting the adhesive face is lost. The release force X is a value as determined in a 180-degree peel test, and more specifically, it is a value determined by the measuring method described in the peel test mentioned below.

The rigidity Y of the release liner according to the present invention [(Young's modulus of the release liner)×(thickness of the release liner)$^3$] is preferably more than 0 (N·mm) and less than [180X$^4$+0.1] (N·mm), from the viewpoint of inhibiting liner pop-off. The rigidity Y is a value represented by the Young's modulus of the release liner in a flow direction (machine direction) multiplied by (thickness of the release liner)$^3$ and indicates how easily the release liner deforms upon application of a bending stress. If the release liner has a rigidity Y of (180X$^4$+0.1) or more and when the pressure-sensitive adhesive tape bearing the release liner is curved, the repulsive force of the release liner becomes relatively larger than the adhesive force, and this may cause liner pop-off, though it depends on the curve degree. The rigidity Y is more preferably from 0.01 to 1.3 (N·mm), and especially preferably from 0.01 to 0.8 (N·mm). Specifically, the rigidity Y is determined, for example, by the measuring method indicted in the after-mentioned rigidity test. The relationship between the release force X and the rigidity Y [0<Y<180X$^4$+0.1] is a finding obtained empirically through polynomial approximation based on actual measurements in experiments.

When the pressure-sensitive adhesive layer for use in the pressure-sensitive adhesive sheet according to the present invention shows a large volumetric change as in the case of a cellular layer (bubble-containing pressure-sensitive adhesive layer) or when the pressure-sensitive adhesive layer is thick (for example, with thickness of 100 μm or more), the liner pop-off may especially remarkably occur, and it is specifically important to control the parameters X and Y.

The pressure-sensitive adhesive layer for use in the present invention contains a pressure-sensitive adhesive as a main component. The content of the pressure-sensitive adhesive in the pressure-sensitive adhesive layer is preferably 50 percent by weight or more, and more preferably 90 percent by weight or more.

Though not especially limited, preferred examples of the pressure-sensitive adhesive include polyacrylate pressure-sensitive adhesives containing a polyacrylate and/or a polymethacrylate (hereinafter also referred to as "poly(meth) acrylate, ditto for others). The polyacrylate pressure-sensitive adhesive each include an acrylic polymer as a base resin, which acrylic polymer is formed through polymerization (or copolymerization) of an alkyl(meth)acrylate as an essential monomer component, where necessary in combination with a modifying monomer component copolymerizable with the alkyl(meth)acrylate. The polymerization process is not especially limited and can be any process known or common to those skilled in the art, such as ultraviolet-ray polymerization, solution polymerization, or emulsion polymerization. Among them, ultraviolet-ray polymerization is preferred especially when a thick pressure-sensitive adhesive layer is to be formed.

Preferred examples of the alkyl(meth)acrylate include butyl(meth)acrylates and 2-ethylhexyl(meth)acrylates. Preferred examples of the copolymerizable modifying monomer component include 2-hydroxyethyl(meth)acrylates, (meth) acrylic acids, styrene, and vinyl acetate. When a modifying monomer component is copolymerized, the ratio (by weight) of the alkyl(meth)acrylate to the modifying monomer in copolymerization is not especially limited but is preferably from 100/0 to 70/30, and more preferably from 97/3 to 80/20. The polyacrylate pressure-sensitive adhesive may further contain various additives according to necessity within ranges not adversely affecting the advantages of the present invention. Each of different polyacrylate pressure-sensitive adhesives may be used alone, or two or more of them may be used as a mixture mixed through a known mixing process or agitating process.

The thickness of the pressure-sensitive adhesive layer for use in the present invention may vary depending typically on the type of the adhesive layer, is not especially limited, but is generally from about 1 μm to about 5 mm. Typically, when the pressure-sensitive adhesive layer contains bubbles, the thickness thereof is preferably from 100 μm to 4 mm, and more preferably from 200 μm to 3 mm.

The pressure-sensitive adhesive layer for use in the present invention may contain bubbles. Such pressure-sensitive adhesive layer containing bubbles can more satisfactorily follow, for example, depressions and protrusions, thus being preferred. Exemplary processes for incorporating bubbles into the layer include, but not especially limited to, a process of mixing a surfactant with a pressure-sensitive adhesive composition to form bubbles. Preferred examples of the surfactant herein include fluorine-containing surfactants.

The possible amount of bubbles, if contained, in a composition to constitute the pressure-sensitive adhesive is not especially limited and can be appropriately selected according typically to the purpose of use within ranges not adversely affecting properties such as adhesive properties. From the viewpoint of stress relaxation, the lower limit of the amount is preferably 10 percent by volume or more, more preferably 11 percent by volume or more, and furthermore preferably 12 percent by volume or more; and from the viewpoint of adhesion, the upper limit thereof is preferably 50 percent by volume or less, more preferably 40 percent by volume or less, and furthermore preferably 30 percent by volume or less, based on the total volume of the pressure-sensitive adhesive composition.

The bubbles generally have a spheroidal shape (of which a spherical shape is preferred), but may have a distorted spheroidal shape. The average diameter of the bubbles is not specifically limited and can be selected within ranges of, for example, from 1 to 1000 μm, preferably from 10 to 500 μm, and furthermore preferably from 30 to 300 μm.

A gaseous component contained in the bubbles (a gas component constituting the bubbles; hereinafter also referred to as "bubble-constituting gas") is not especially limited and can be any gaseous component including an inert gas such as nitrogen, carbon dioxide, or argon gas, as well as air. When a reaction such as polymerization reaction is carried out after a bubble-constituting gas is incorporated into the composition, it is important that the bubble-constituting gas to be used does not inhibit the reaction. Nitrogen is preferred as the bubble-constituting gas, because it does not inhibit such reactions and is available at low cost.

The pressure-sensitive adhesive layer may contain hollow microspheres. Such hollow microspheres, if contained, work to increase, for example, shear adhesive strength and work to improve the processability. Each of different types of hollow microspheres may be used alone or in combination.

The hollow microspheres may be either hollow inorganic microspheres or hollow organic microspheres. Specifically, of hollow microspheres, exemplary hollow inorganic microspheres include hollow balloons made of glass, such as hollow glass balloons; hollow balloons made of metallic compounds, such as hollow alumina balloons; and hollow balloons made of ceramics, such as hollow ceramic balloons.

Exemplary hollow organic microspheres include hollow balloons made of resins, such as hollow acrylic balloons and hollow vinylidene chloride balloons. The surfaces of such hollow microspheres may have been subjected to any of surface treatments such as a treatment for reducing surface tension typically with a silicone compound or fluorine compound.

Though not especially limited, the particle diameter (average particle diameter) of the hollow microspheres can be selected within ranges of, for example, from 1 to 500 μm, preferably from 5 to 200 μm, and furthermore preferably from to 100 μm.

Though not especially limited, the specific gravity of the hollow microspheres can be selected within ranges typically from 0.1 to 0.8 $g/cm^3$, and preferably from 0.12 to 0.5 $g/cm^3$. When hollow microspheres, if having a specific gravity of less than 0.1 $g/cm^3$, are mixed with the pressure-sensitive adhesive composition, they may significantly rise to the surface of the composition and hardly disperse uniformly in the composition. Hollow microspheres, if having a specific gravity of more than 0.8 $g/cm^3$, may be expensive to increase the cost.

Though not especially limited, the amount of the hollow microspheres may be selected within such a range that the hollow microspheres constitute 10 to 50 percent by volume, and preferably 15 to 40 percent by volume, of the total volume of the pressure-sensitive adhesive composition layer. Hollow microspheres, if used in an amount of less than 10 percent by volume, may not exhibit sufficient advantages; and in contrast, hollow microspheres, if used in an amount of more than 50 percent by volume, may cause an insufficient adhesive strength.

As the pressure-sensitive adhesive layer containing bubbles and/or hollow microspheres, for example, the pressure-sensitive adhesive layer described in Japanese Unexamined Patent Application Publication (JP-A) No. 2006-022189 can be used.

The pressure-sensitive adhesive layer for use in the present invention may contain suitable additives according to the purpose of use. Specifically, the pressure-sensitive adhesive layer may contain suitable additives according to the type of the pressure-sensitive adhesive, and examples thereof include crosslinking agents such as polyisocyanate crosslinking agents, silicone crosslinking agents, epoxy crosslinking agents, and alkyl-etherified melamine crosslinking agents; tackifiers including ones that are solid, semisolid, or liquid at ambient temperature (room temperature) and mainly contain materials such as rosin derivative resins, polyterpene resins, petroleum resins, and oil-soluble phenolic resins; plasticizers; fillers; age inhibitors; antioxidants; colorants such as pigments and dyestuffs; and surfactants other than fluorine surfactants containing fluorocarbon polymers having a weight-average molecular weight of 20000 or more. When the pressure-sensitive adhesive layer is formed typically by using a photoinitiator, pigments (coloring pigments) can be used for coloring to such an extent that the photopolymerization is not inhibited. When the pressure-sensitive adhesive layer is to be colored black, carbon black, for example, can be used.

Exemplary sheet structures of the pressure-sensitive adhesive sheet having the release liner according to the present invention include (1) a structure including a release liner and a single-layer pressure-sensitive adhesive layer having no carrier (substrate); and (2) a structure of a double-sided pressure-sensitive adhesive sheet which includes a carrier (substrate) and, arranged on both sides thereof, pressure-sensitive adhesive layers and release liners. When release liners are arranged on both sides of the sheet, it is enough for the release liner according to the present invention to be arranged on at least one side.

The pressure-sensitive adhesive sheet according to the present invention may also have such a structure that a pressure-sensitive adhesive layer (or a multilayer sheet including a carrier, and arranged on both sides thereof, pressure-sensitive adhesive layers) is arranged on one side (release surface) of a release liner, and the other side (backside) of the release liner is in contact with the side of the pressure-sensitive adhesive layer opposite to the release liner by winding the sheet as a roll or by stacking two or more plies of the sheet.

The carrier (substrate) can be any carrier or substrate that is known or common in pressure-sensitive adhesive tapes or sheets. Examples thereof include suitable thin articles including paper substrates such as papers; fibrous substrates such as fabrics, nonwoven fabrics, and nets; metallic substrates such as metal foils and metal sheets; plastic substrates such as plastic films and sheets; rubber substrates such as rubber sheets; foams such as foamed sheets; and laminates of these, such as a laminate of a plastic substrate with another substrate, and a laminate of two or more plies of plastic films or sheets. Exemplary materials for such plastic films and sheets include olefinic resins containing an α-olefin as a monomer component, such as polyethylenes (PEs), polypropylenes (PPs), ethylene-propylene copolymers, and ethylene-vinyl acetate copolymers (EVAs); polyesters such as poly(ethylene terephthalate)s (PETs), poly(ethylene naphthalate)s (PENs), and poly(butylene terephthalate)s (PBTs); poly(vinyl chloride)s (PVCs); vinyl acetate resins; poly(phenylene sulfide)s (PPSs); amide resins such as polyamides (nylons) and wholly aromatic polyamides (aramids); polyimide resins; and poly(ether ether ketone)s (PEEKs). Each of different materials can be used alone or in combination.

A release liner other than the release liner according to the present invention, if used in the pressure-sensitive adhesive sheet according to the present invention, can be any known or common release liner. Specifically, an exemplary preferred release liner includes a release liner (separator) that has a release-liner substrate, and arranged on at least one side thereof, a releasably treated layer. Exemplary release-liner substrates include plastic base films (synthetic resin films) including polyester films (such as poly(ethylene terephthalate) films), olefin resin films (such as polyethylene films and polypropylene films), poly(vinyl chloride) films, polyimide films, polyamide films (nylon films), and rayon films; papers (such as woodfree paper, Japanese paper, kraft paper, glassine paper, synthetic paper, and topcoat paper), as well as assemblies of these materials (assemblies of two or three layers) stacked through lamination or coextrusion. A releasing agent constituting the releasably treated layer is not especially limited, and examples of usable releasing agents include silicone releasing agents, fluorine releasing agents, and long-chain alkyl releasing agents. Each of different releasing agents may be used alone or in combination. When the release liner according to the present invention is used in combination with another release liner, the other release liner than the release liner according to the present invention will be removed prior to the release liner according to the present invention.

A process to form the pressure-sensitive adhesive layer for use in the present invention may vary depending on the types or structures of the pressure-sensitive adhesive layer and the pressure-sensitive adhesive sheet, is not especially limited, but examples thereof include (1) a process of applying a layer of pressure-sensitive adhesive by a known coating procedure on a release layer, and curing the coated layer, and (2) a process of forming a pressure-sensitive adhesive layer on a carrier and applying the pressure-sensitive adhesive layer to a release liner.

The pressure-sensitive adhesive sheet can take the form typically of a sheet or tape. It may also be wound as a roll.

The pressure-sensitive adhesive sheet according to the present invention does not suffer from pop-off of the release liner and exhibits a superior release function upon use, even when it is stored in a curved state or it contains bubbles whereby the pressure-sensitive adhesive layer is likely to deform. The pressure-sensitive adhesive sheet is therefore preferably used especially as an adhesive sheet or adhesive tape for a long or complicated-shape member or flexible member. Specifically, it is preferably used typically as a double-sided adhesive tape for bonding an automobile weather strip or another rubbery material.

[Methods for Measuring Properties and for Determining Advantages]

(1) Peel Test (Release Force X)

Strip test samples 7 mm wide were prepared from pressure-sensitive adhesive sheets obtained according to Examples and Comparative Examples, in which the longitudinal direction of the test sample is a machine direction (MD) of the sheet.

Each of the sample pressure-sensitive adhesive sheets, from which a silicone-treated polyester film had been removed, was applied to a polyester film ("Lumirror S-10" supplied by Toray Industries, Inc.) 50 μm thick, and the polyester film was applied and fixed to a sheet-like article (stainless steel SUS 304BA sheet, 50 mm wide and 150 mm long) for supporting rigidity.

On the samples, 180-degree peel tests were conducted with a universal tensile tester ("TG-1kNB" supplied by Minebea Co., Ltd.). In the tests, the release liner side was pulled, the resistance was measured, and this was defined as a release force X (N/mm).

The tests were carried out in accordance with Japanese Industrial Standards (JIS) Z0237 in an atmosphere of a temperature of 23° C. and relative humidity of 60% at a rate of pulling (crosshead speed) of 300 mm/minute. The tests were conducted three times on each sample, and the average of measurements was defined as the release force X.

When the release force X is more than 0.285 (N/mm), it is difficult to release or separate the release liner, i.e., release failure occurs.

(2) Rigidity Test (Rigidity Y)

Test samples were prepared by punching the release liners of the pressure-sensitive adhesive sheets obtained according to Examples and Comparative Examples with a dumbbell No. 3 (direction of measurement: machine direction (MD)).

The Young's modulus of each sample release liner was measured by carrying out tensile tests with a universal tensile tester at an original length (measurement length) of 20 mm, a sample width of 5 mm, and a rate of pulling of 500 mm/minute. Measurements were conducted three times on each sample. Independently, the thickness of the sample release liner was measured with a dial gauge.

Based on these measurements, the rigidity Y [Young's modulus×(thickness)$^3$] (N·mm) of the release liner was calculated.

(3) Liner Pop-Off

Strip samples 7 mm wide and 100 mm long (machine direction) were prepared from the pressure-sensitive adhesive sheets obtained according to Examples and Comparative Examples.

Each of the sample pressure-sensitive adhesive sheets, from which a silicone-treated polyester film had been removed, was applied to a polyvinyl chloride) sheet coated with a urethane primer (45 mm wide, 150 mm long, and 1 mm thick, supplied by Riken Technos Corporation), and compression bonding therebetween was conducted by one reciprocating motion of a 5-kg roller (roller width: 65 mm) to give test pieces.

Figure 2:
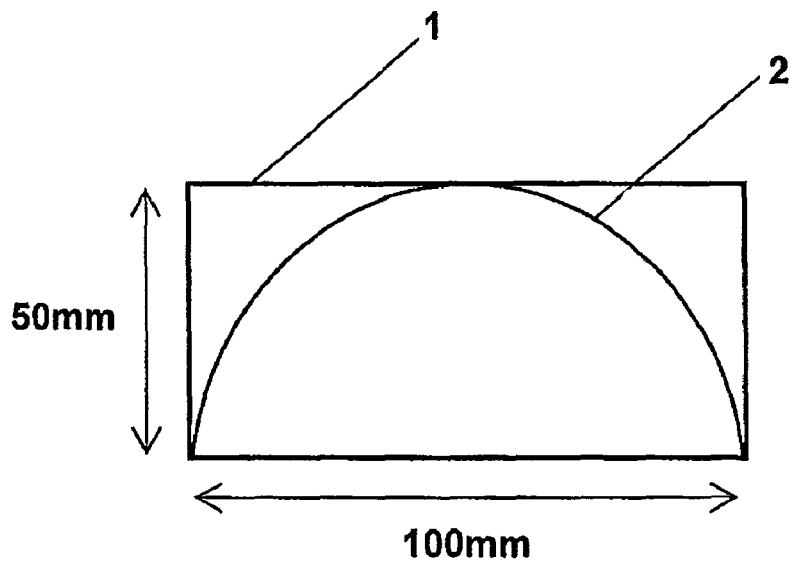
FIG. 2 is a schematic top view showing how to fix a test piece to a fixing box in a method for evaluating the "liner pop-off".

After storing for 24 hours, each of the test pieces was elliptically curved so that the release liner faced inward and fixed in a fixing box 100 mm long, 50 mm wide, and 30 mm high, as illustrated in FIG. 2. The lengths of liner pop-off portions were measured 72 hours later, and the lengths of pop-off portions per one test piece were totaled. The tests were carried out in an atmosphere of a temperature of 23° C. and relative humidity of 60%.

A sample having a total length of pop-up portions of 10 mm or less was evaluated as having a good liner pop-off inhibitory action (Good), and one having a total length of pop-up portions of more than 10 mm was evaluated as having a poor liner pop-off inhibitory action (Poor).

(4) Heat Test (Thermal Stability)

Strip samples 7 mm wide and 100 mm long (machine direction) were prepared from the pressure-sensitive adhesive sheets obtained according to Example 4 and Comparative Example 2.

Each of the sample pressure-sensitive adhesive sheets, from which a silicone-treated polyester film had been removed, was applied to a poly(vinyl chloride) sheet coated with a urethane primer (45 mm wide, 150 mm long, and 1 mm thick, supplied by Riken Technos Corporation), and compression bonding therebetween was conducted by one reciprocating motion of a 5-kg roller (roller width: 65 mm) to give test pieces.

After storing for 24 hours, a side of the poly(vinyl chloride) sheet opposite to the sample was applied to a stainless steel (SUS) plate having the same size with that of the poly(vinyl chloride) sheet using a double-sided tape ("No. 500" supplied by Nitto Denko Corporation), so as to prevent the poly(vinyl chloride) sheet from deforming in heat tests. The resulting articles were subjected to a heat treatment in an oven at 120° C. for 3 minutes.

The test pieces immediately after taking out from the oven into room-temperature conditions were observed, and a test piece showing neither pop-off nor separation of the release liner was evaluated as having good thermal stability (Good), and one showing pop-off and/or separation of the release liner was evaluated as having poor thermal stability (Poor).

EXAMPLES

The present invention will be illustrated in further detail with reference to several examples below. It should be noted, however, these are illustrated only by way of example and never construed to limit the scope of the present invention.

Example 1

Compositions mentioned below were extruded into a sheet through three-layer coextrusion inflation molding and thereby yielded a release liner (thickness: 100 μm) composed of a release layer (thickness: 14 μm), an intermediate layer (thickness: 43 μm), and a backside layer (thickness: 43 μm).

Release layer: a high-density polyethylene resin (trade name "Evolue SP4520" supplied by Prime Polymer Co., Ltd., having a density of 942 kg/m$^3$)

Intermediate layer and backside layer: a low-density polyethylene resin (trade name "NOVATEC LD YF30" supplied by Japan Polyethylene Corporation, having a density of 920 kg/m$^3$)

An acrylic foam tape ("A4008" supplied by Nitto Denko Corporation, a bubble-containing single-layer pressure-sensitive adhesive layer) was applied to the release liner so that the release layer of the release liner was in contact with one of the pressure-sensitive adhesive layers of the tape. Next, a silicone-treated polyester film ("MRF38" supplied by Mitsubishi Polyester Film GmbH (Mitsubishi Plastics Inc.)) was applied to the other pressure-sensitive adhesive layer of the tape to give a pressure-sensitive adhesive sheet.

Example 2

Compositions mentioned below were extruded into a sheet through three-layer coextrusion inflation molding and thereby yielded a release liner (thickness: 50 μm) composed of a release layer (thickness: 10 μm), an intermediate layer (thickness: 20 μm), and a backside layer (thickness: 20 μm).

Release Layer: a mixture of a high-density polyethylene resin (trade name "HI-ZEX 3300F" supplied by Prime Polymer Corporation, having a density of 950 kg/m$^3$) and a low-density polyethylene resin (trade name "NOVATEC LD LF440HB" supplied by Japan Polyethylene Corporation, having a density of 925 kg/m$^3$)

[the Ratio (by Weight) of the High-Density Polyethylene to the Low-Density Polyethylene: 60/40]

Intermediate layer and backside layer: a low-density polyethylene resin (trade name "NOVATEC LD UF641" supplied by Japan Polyethylene Corporation, having a density of 927 kg/m$^3$)

A pressure-sensitive adhesive sheet was prepared by the procedure of Example 1, except for using the above-prepared release liner.

Example 3

Compositions mentioned below were extruded into a sheet through three-layer coextrusion inflation molding and thereby yielded a release liner (thickness: 100 μm) composed of a release layer (thickness: 14 μm), an intermediate layer (thickness: 43 μm), and a backside layer (thickness: 43 μm).

Release layer: a high-density polyethylene resin (trade name "HI-ZEX 3300F" supplied by Prime Polymer Corporation, having a density of 950 kg/m$^3$)

Intermediate layer and backside layer: a low-density polyethylene resin (trade name "NOVATEC LL UF331" supplied by Japan Polyethylene Corporation, having a density of 923 kg/m$^3$)

A pressure-sensitive adhesive sheet was prepared by the procedure of Example 1, except for using the above-prepared release liner.

Example 4

Compositions mentioned below were extruded into a sheet through three-layer coextrusion using a T-die and thereby yielded a release liner (thickness: 100 μm) composed of a release layer (thickness: 37 μm), an intermediate layer (thickness: 52.5 μm), and a backside layer (thickness: 10.5 μm).

Release layer: a high-density polyethylene resin (trade name "HI-ZEX 3300F" supplied by Prime Polymer Corporation, having a density of 950 kg/m$^3$)

Intermediate layer and backside layer: a low-density polyethylene resin (trade name "OM05B" supplied by Tosoh Corporation, having a density of 924 kg/m$^3$)

A pressure-sensitive adhesive sheet was prepared by the procedure of Example 1, except for using the above-prepared release liner.

Comparative Example 1

A pressure-sensitive adhesive sheet was prepared by the procedure of Example 1, except for using, as a release liner, a polyethylene single-layer extruded film (supplied by Aichi Plastics Industry Co., Ltd., thickness: 100 μm) made from a low-density polyethylene resin (trade name "NUC8160" supplied by Nippon Unicar Co., Ltd.).

Comparative Example 2

Compositions mentioned below were extruded into a sheet through three-layer coextrusion inflation molding and thereby yielded a release liner (thickness: 100 μm) composed of a release layer (thickness: 14 μm), an intermediate layer (thickness: 43 μm), and a backside layer (thickness: 43 μm).

Release layer: a low-density polyethylene resin (trade name "NOVATEC LD UF641" supplied by Japan Polyethylene Corporation, having a density of 927 kg/m$^3$)

Intermediate layer and backside layer: a mixture of a high-density polyethylene resin (trade name "HI-ZEX 3300F" supplied by Prime Polymer Corporation, having a density of 950 kg/m$^3$) and a low-density polyethylene resin (trade name "NOVATEC LD LF440HB" supplied by Japan Polyethylene Corporation, having a density of 925 kg/m$^3$)

[the Ratio (by Weight) of the High-Density Polyethylene to the Low-Density Polyethylene: 60/40]

A pressure-sensitive adhesive sheet was prepared by the procedure of Example 1, except for using the above-prepared release liner.

Comparative Example 3

A polyethylene resin (trade name "NC499A" supplied by Japan Polyethylene Corporation, having a density of 935 kg/m$^3$) was melted at a temperature of 150° C. and pressed into a sheet at a pressure of 10 MPa, the sheet was naturally cooled and thereby yielded a release liner (180 μm).

A pressure-sensitive adhesive sheet was prepared by the procedure of Example 1, except for using the above-prepared release liner.

Comparative Example 4

A polyethylene resin (trade name "Xu.59900.20" supplied by The Dow Chemical Company, having a density of 940 kg/m$^3$) was melted at a temperature of 150° C. and pressed into a sheet at a pressure of 10 MPa, the sheet was naturally cooled and thereby yielded a release liner (180 μm).

A pressure-sensitive adhesive sheet was prepared by the procedure of Example 1, except for using the above-prepared release liner.

Comparative Example 5

A high-density polyethylene resin (trade name "HI-ZEX 5000SF" supplied by Prime Polymer Corporation, having a density of 956 kg/m$^3$) was melted at a melting temperature of 150° C. and pressed into a sheet at a pressure of 10 MPa, the sheet was naturally cooled and thereby yielded a release liner (100 μm).

A pressure-sensitive adhesive sheet was prepared by the procedure of Example 1, except for using the above-prepared release liner.

Comparative Example 6

A high-density polyethylene resin (trade name "HI-ZEX 7000F" supplied by Prime Polymer Corporation, having a density of 952 kg/m³) was melted at a temperature of 150° C. and pressed into a sheet at a pressure of 10 MPa, the sheet was naturally cooled and thereby yielded a release liner (150 µm).

A pressure-sensitive adhesive sheet was prepared by the procedure of Example 1, except for using the above-prepared release liner.

The results in the peel tests, rigidity tests, liner pop-off tests are shown in Table 1 and FIG. 1. In FIG. 1, data indicated by open circles are data of sheets showing no liner pop-off (Examples 1 to 4 and Comparative Examples 5 and 6); and data indicated by crosses are data of sheets showing liner pop-off (Comparative Examples 1 to 4). The curve in the graph indicates: $Y=180X^4+0.1$, and the dotted line indicates: $X=0.285$. As apparent from the results in Table 1, the release liners according to the present invention (Examples) each having a specific resinous structure have a rigidity and a release force both within suitable ranges and show a superior release function and a satisfactory liner pop-off inhibitory action. In contrast, the release liners (Comparative Examples) not having a specific resinous structure specified in the present invention fail to have a satisfactory release function and a satisfactory liner pop-off inhibitory action simultaneously, in which they have an insufficient liner pop-off inhibitory action (Comparative Examples 1 to 4) or have insufficient releasability (Comparative Examples 5 and 6).

TABLE 1

|  | Liner pop-off inhibition | Release force X (N/mm) | Rigidity Y of release liner (N · mm) |
|---|---|---|---|
| Example 1 | Good | 0.20 | 0.12 |
| Example 2 | Good | 0.10 | 0.03 |
| Example 3 | Good | 0.22 | 0.22 |
| Example 4 | Good | 0.23 | 0.17 |
| Comparative Example 1 | Poor | 0.05 | 0.15 |
| Comparative Example 2 | Poor | 0.13 | 0.29 |
| Comparative Example 3 | Poor | 0.21 | 1.03 |
| Comparative Example 4 | Poor | 0.27 | 1.23 |
| Comparative Example 5 | Good | 0.29 | 0.57 |
| Comparative Example 6 | Good | 0.30 | 1.31 |

Independently, the pressure-sensitive adhesive sheets according to Example 4 and Comparative Example 2 were subjected to heat tests, and thermal stabilities of them were compared. As a result, the pressure-sensitive adhesive sheet according to the present invention (Example 4) shows good thermal stability (Good), but the pressure-sensitive adhesive sheet according to Comparative Example 2 shows poor thermal stability (Poor).

INDUSTRIAL APPLICABILITY

The release liners and pressure-sensitive adhesive sheets according to the present invention excel in releasability and do not suffer from liner pop-off even when, for example, they are stored in a curved state. The release liners also excel in recyclability, because they do not contain, for example, polar groups and have a simple configuration in which respective layers contain polyethylenes. The release liners and pressure-sensitive adhesive sheets are therefore industrially useful, from the viewpoints of performance and environmental friendliness, for use in or for use as adhesive sheets or adhesive tapes to be applied to a long or complicated-shape member or a flexible member, and more specifically, as double-sided adhesive tapes for bonding an automobile weather strip or another rubbery material.

The invention claimed is:

1. A pressure-sensitive adhesive sheet comprising:
a release liner having a multilayer structure of at least three layers comprising two surface layers and an intermediate layer lying between them; and
at least one pressure-sensitive adhesive layer,
wherein one of the two surface layers of the release liner contains 50 percent by weight or more of a high-density polyethylene of total resin components constituting the surface layer, the other surface layer of the release liner contains 50 percent by weight or more of a low-density polyethylene of total resin components constituting the other surface layer, and the intermediate layer of the release liner contains, as its resin component, 95 percent by weight or more of a low-density polyethylene of total resin components constituting the intermediate layer;
the surface layer containing 50 percent by weight or more of a high-density polyethylene of total resin components constituting the surface layer is used as a release layer;
the pressure-sensitive adhesive layer is arranged on the surface layer containing 50 percent by weight or more of a high-density polyethylene of total resin components constituting the surface layer;
the pressure-sensitive adhesive layer contains a polyacrylate pressure-sensitive adhesive;
the pressure-sensitive adhesive sheet has a release force X (unit: N/mm) between the release liner and the pressure-sensitive adhesive layer;
the release liner has a rigidity Y [(Young's modulus of the release liner)×(thickness of the release liner)³] (unit: N·mm);
the release force X and the rigidity Y satisfy the following conditions:

$$0<X\leq 0.285$$

$$0<Y<180X^4+0.1;$$

the content of other resin components than the low-density polyethylenes and the high-density polyethylenes is less than 20 percent by weight based on the total resin components of the release liner;
the pressure-sensitive adhesive layer contains bubbles and/or hollow microspheres; and
the specific gravity of the hollow microspheres is selected within ranges from 0.1 to 0.8 g/cm³.

2. The pressure-sensitive adhesive sheet according to claim 1, wherein the release liner has a thickness of from 10 to 500 µm.

3. The pressure-sensitive adhesive sheet according to claim 1, wherein the thickness of the intermediate layer is from 43 to 480 µm.

4. The pressure-sensitive adhesive sheet according to claim 1, wherein the release force X between the pressure-sensitive adhesive layer and the release liner is from 0.15 to 0.25 (N/mm).

5. The pressure-sensitive adhesive sheet according to claim 1, wherein the thickness of the other surface layer containing 50 percent by weight or more of a low density polyethylene is from 43 to 250 µm.

* * * * *